United States Patent
Drori et al.

[11] Patent Number: 5,563,576
[45] Date of Patent: Oct. 8, 1996

[54] VEHICLE SECURITY SYSTEM SIREN WITH BACKUP RECHARGEABLE BATTERY

[75] Inventors: Ze'ev Drori, Los Angeles; Mark I. Simon, Woodland Hills, both of Calif.

[73] Assignee: Clifford Electronics, Inc., Chatsworth, Calif.

[21] Appl. No.: 384,351

[22] Filed: Feb. 2, 1995

Related U.S. Application Data

[63] Continuation of Ser. No. 971,955, Nov. 5, 1992, abandoned.
[51] Int. Cl.$^6$ ................................................ B60Q 1/00
[52] U.S. Cl. ..................... 340/455; 340/426; 340/636; 307/66; 320/21; 320/48; 320/61
[58] Field of Search ...................... 340/636, 426, 340/455; 320/21, 48, 61, 62, 64; 307/66, 107

[56] References Cited

U.S. PATENT DOCUMENTS

| | | | |
|---|---|---|---|
| 3,795,818 | 3/1974 | Beaman | 307/66 |
| 4,006,450 | 2/1977 | Ofenleger | |
| 4,006,451 | 2/1977 | Nobile | 340/426 |
| 4,754,255 | 6/1988 | Sanders et al. | |
| 4,761,631 | 8/1988 | Hwang | 340/455 |
| 4,887,064 | 12/1989 | Drori et al. | 340/426 |
| 4,922,224 | 5/1990 | Drori et al. | 340/428 |
| 4,929,931 | 5/1990 | McCuen | 340/455 X |
| 4,990,885 | 2/1991 | Irick et al. | 340/455 |
| 5,157,375 | 10/1992 | Drori | 340/429 |

Primary Examiner—Jeffery Hofsass
Assistant Examiner—Daniel J. Wu
Attorney, Agent, or Firm—Roberts and Quiogue

[57] ABSTRACT

A vehicle security siren that includes a rechargeable back-up battery and an electronic circuit that minimizes current drain from the vehicle's battery by controlling the rate at which the siren's back-up battery is charged by the vehicle's battery. The circuit charges the siren's battery at a relatively high rate when the vehicle engine is running or the ignition is on, and by a low charging rate at other times. This multi-level charging rate preserves the vehicle's battery charge particularly if the vehicle is not driven for any extended time period. The circuit includes a back-up battery condition detector that issues a warning signal in the event of failure of the back-up battery. The circuit also limits the maximum siren duration in the event that either the vehicle's battery or the security system is disconnected from the siren.

14 Claims, 4 Drawing Sheets

VEHICLE SECURITY SYSTEM SIREN WITH BACKUP RECHARGEABLE BATTERY

This is a continuation of application Ser. No. 07/971,955 filed on Nov. 5, 1992, now abandoned.

BACKGROUND OF THE INVENTION

The present invention relates to vehicle security systems, and more particularly to systems employing a siren with a backup rechargeable battery.

Presently sirens with a built-in rechargeable battery are commonly used with car alarms. The built-in battery is supposed to insure that the siren will sound if either the vehicle's 12 V battery is disconnected or if the siren is disconnected from the alarm system. In either case, the siren will sound continuously until the built-in battery charge is depleted or, if the owner is within earshot, he may turn the siren off with a key switch built into the siren.

The present art has several drawbacks. The first one is that the rechargeable battery draws its charged current from the vehicle's battery at a constant charging rate regardless of whether the engine is on or off. In addition, since the rechargeable battery has a voltage of 7.2 V while the vehicle's battery is at 12 V–15 V there is a continuous current discharge of typically 35–55 milliamps from the vehicle's battery even when the rechargeable battery is fully charged. That discharge will deplete the vehicle's own battery if the car is not driven for a time period of two weeks or more. Consequently, the owner may be unable to start the vehicle. What is more, if the voltage of the vehicle's battery drops below the rechargeable battery, it will cause the siren to sound until the rechargeable battery is also depleted causing in the meantime serious disturbances due to noise pollution. Paradoxically the very same rechargeable battery that was intended to improve the effectiveness and security provided by the alarm may in fact directly cause it to fail and also damage the vehicle's battery in the process.

Lastly, if the rechargeable battery is unable to hold a charge for any reason or if it malfunctions, presently there is no way for the owner of the vehicle to know of the problem.

SUMMARY OF THE INVENTION

This invention remedies all three problems described above.

First, it provides for two different levels of charging the built-in rechargeable battery. The internal rechargeable battery will be charged at full rate only when either the vehicle's engine is running or if the ignition system is energized. Otherwise the rechargeable battery is charged at very low maintenance level of about 3 milliamps. Since the engine is "on" when the rechargeable battery is being charged, the vehicle's own alternator charges the vehicle's battery at a higher rate than its discharge and thus more than offsets the depletion problem. Similarly, the very low maintenance current virtually eliminates the vehicle's battery drain problem when the engine is off. The result is that the owner may leave the vehicle undriven for a substantially longer period of time and longer lifetime for the vehicle's battery.

Second, presently the vehicle's owner has no way to know if the siren's rechargeable battery malfunctions. The new invention instantly notifies the vehicle's owner if the rechargeable battery failed for whatever reason. When that happens the owner will be warned by either a flashing LED and/or through the automatic silencing of the siren's chirps. Since the siren's chirps provide audible acknowledgment each time the alarm is either armed or disarmed, the automatic absence of these chirps will immediately indicate to the owner that the siren's rechargeable battery has failed and therefore allowing for a remedy to be taken as soon as the problem occurs.

Third, the new design also incorporates a time limit of approximately five minutes for sounding the siren if the alarm's wires are cut or the main battery is disconnected. This time limit will prevent excessive noise pollution and will preserve the batteries for their intended purpose.

The new invention provides the following features.

1. Means to substantially reduce current drain from the vehicle's battery in any vehicle equipped with a car alarm which has a siren with a back-up rechargeable battery.

2. Means to automatically and immediately notify the vehicle's owner if the siren's rechargeable battery has failed.

3. Setting of maximum siren duration if either the vehicle's battery is disconnected or if the siren is disconnected from the alarm system.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
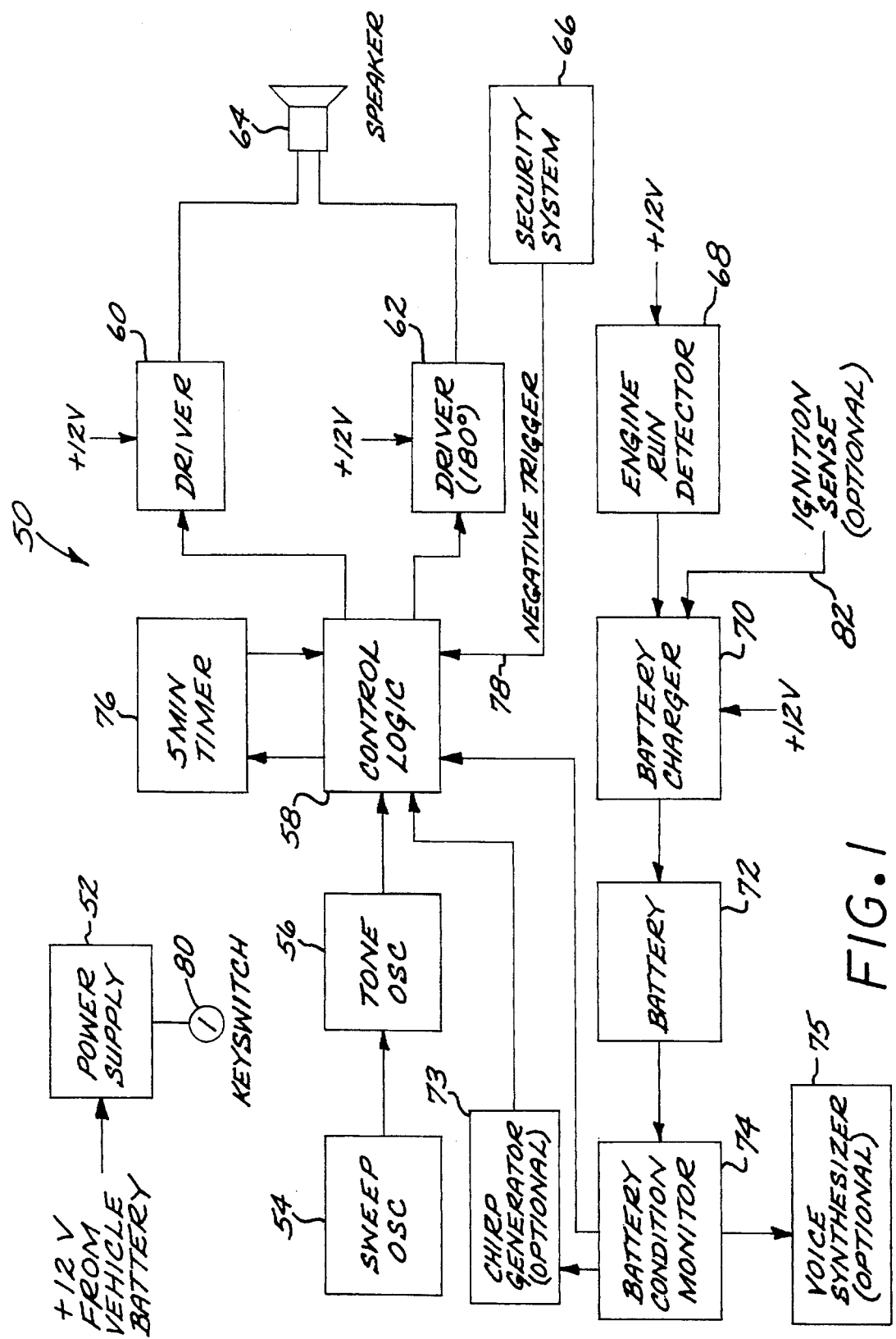
FIG. 1 is a block diagram of a siren with rechargeable battery embodying the invention.

FIG. 1 illustrates in block diagram form an illustrative embodiment of a siren system 50 in accordance with this invention. The system includes a power supply 52 which is powered by the 12 V vehicle battery. The supply 52 in turn provides power to the system 50 under normal conditions. The siren audio transducer 64 converts electrical excitation signals from the drivers 60 and 62 into acoustic energy. In this embodiment, the transducer 64 is an audio speaker. The drivers 60 and 62 are controlled by control logic 58. The control logic 58 activates operation of the transducer 64 in response to receipt of alarm trigger signals from the security system 66, typically when the system 66 has been tripped, or upon arming or disarming to generate audio "chirps" to indicate to the user that the security system has been armed or disarmed. The alarm trigger signals in this embodiment are negative trigger signals on line 78, so that the line 78 is nominally at a positive potential, say 12 V, and drops to a lower voltage, say less than 1 V, to indicate that the siren should be sounded. Once the voltage on line 78 returns to the nominal positive voltage, the siren operation will be shut off. The siren can be chirped by a short negative pulse on line 78.

In this embodiment, the transducer drive signals generate a modulated siren sound, which alternates between two frequencies, e.g. 1 Khz and 3 Khz. A voltage controlled oscillator 56 receives a modulating signal from a sweep oscillator 54, which causes the VCO 56 output to be modulated in frequency between 1 and 3 Khz. The control logic in turn modulates the drivers 60 and 62 to result in the modulated audio output from the transducer 64.

The system 50 further includes an engine run detector 68 whose function is to detect whether the vehicle engine is running, and provide a detector signal to the battery charger 70 indicative of the engine status. The charger 70 may also receive an ignition sense signal on line 82 which indicates whether the vehicle ignition switch is turned on. In accordance with the invention, the charging rate at which the charger 70 charges the backup battery 72 is dependent on whether the vehicle engine is running, or whether the ignition switch is turned on. The normal charging rate is typically between 35 to 55 mA when the engine is running. The engine alternator or generator can recharge the vehicle battery to easily replenish the power drawn by the charger 70 while the engine is running. However, when the engine is not running, a current drain of 35 to 55 mA can within a matter of days deplete the power reserves of the vehicle's battery to the point that the battery is unable to start the engine. Accordingly, when the engine is not running or the ignition switch is not "on" the charging rate is reduced to a maintenance level of about 1 to 3 mA in this embodiment. While this charging rate is not sufficient to recharge the backup battery in the event of a significant load such as prolonged activation of the siren with an inoperable vehicle battery, it will be sufficient to maintain the charge on the battery 72 and, in fact, prevents its discharge so that it can function in its role as a backup for a useful period of time.

The battery 72 is a rechargeable battery, e.g., a nickel cadmium battery, having a nominal voltage in this embodiment of 7.2 V.

The battery 72 is connected to the control logic 58 through a battery condition monitor circuit 74. This circuit 74 monitors the voltage of battery 72 to determine whether the voltage is within a predetermined voltage range. If the voltage is outside that range, indicating failure of the backup battery, the control logic 58 issues a warning to the user of this condition. The warning may take the form of activation of a warning LED, or disabling the siren from "chirping" so that absence of these chirps upon arming or disarming the security system is a signal that the backup battery has failed. Alternatively, the monitor 74 can activate a chirp generator 73 which in turn triggers the control logic 58 to cause a predetermined number of audible chirps to be generated by speaker 64, the specific number being a prearranged signal that the backup battery has failed. Another type of audible warning could be issued by a voice synthesizer 75, generating a voice message indicating the backup battery has failed.

A further feature of this invention is the timer 76, which provides a maximum time limit the siren transducer may sound in the event the siren system is disconnected from the security system, indicated by removal of the positive potential on line 78, or if the vehicle battery is disconnected.

Figure 2A:
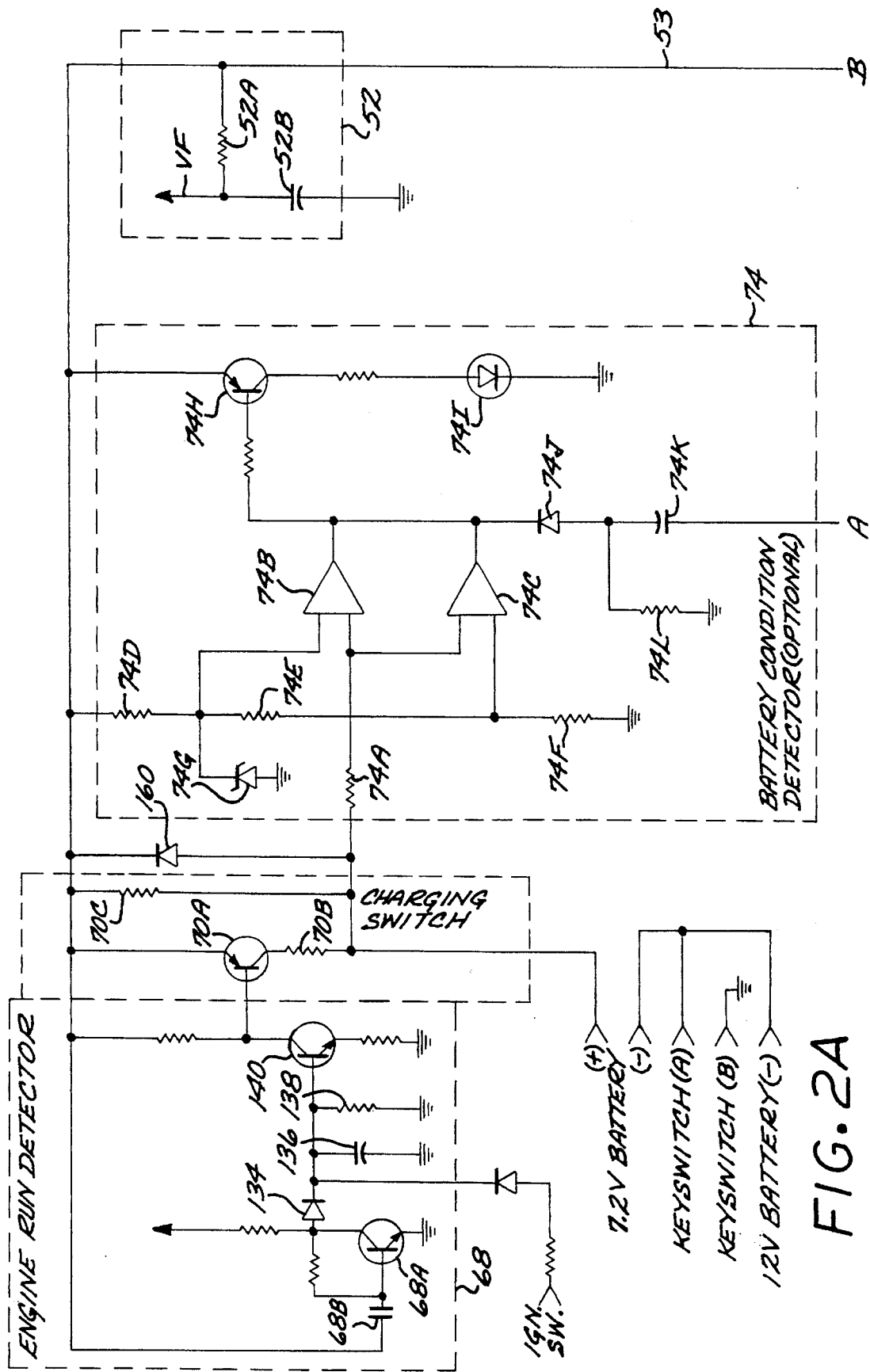
FIGS. 2A–2C are schematic diagrams illustrating exemplary circuitry for implementing the siren of FIG. 1.
Figure 2B:
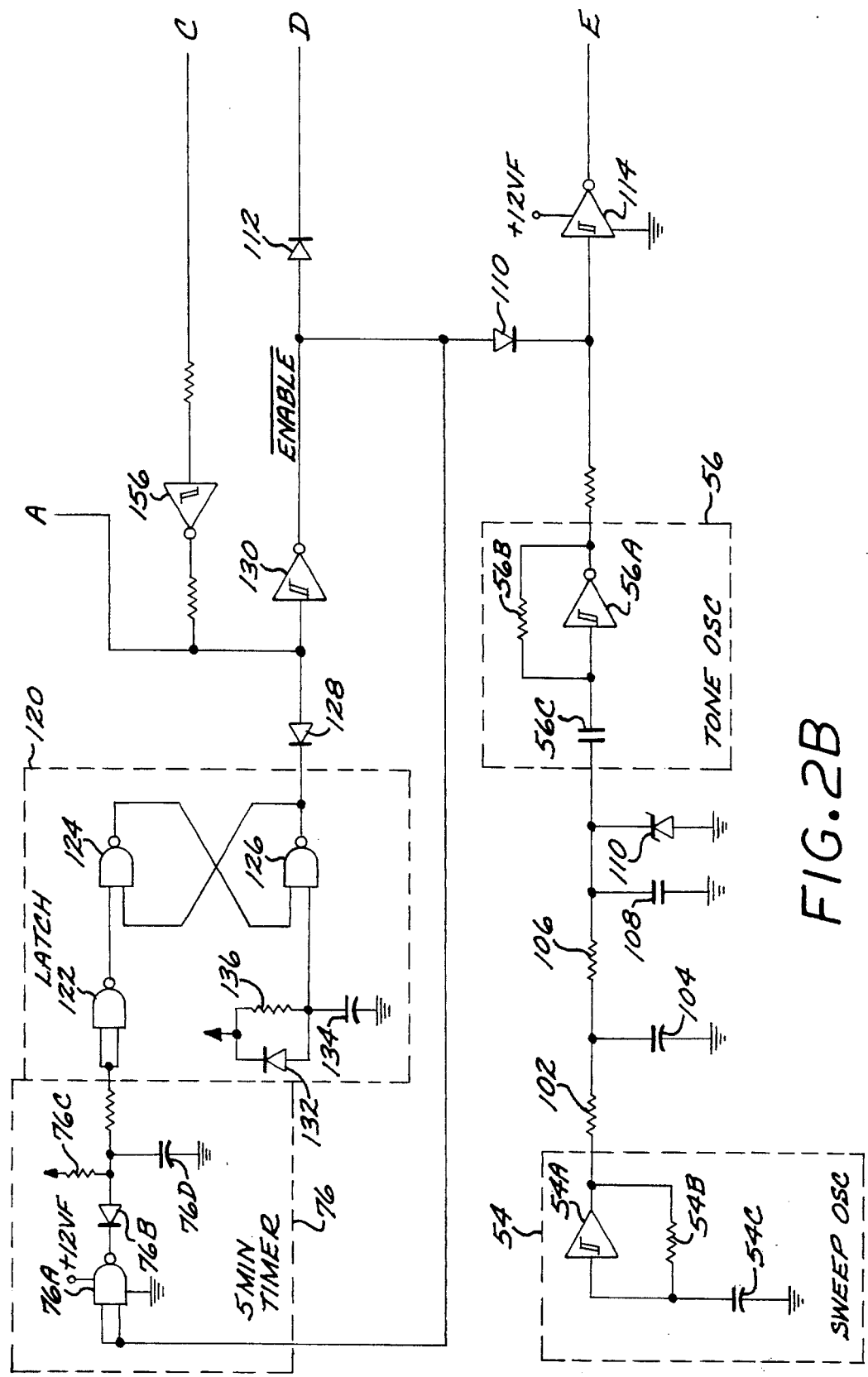
Figure 2C:
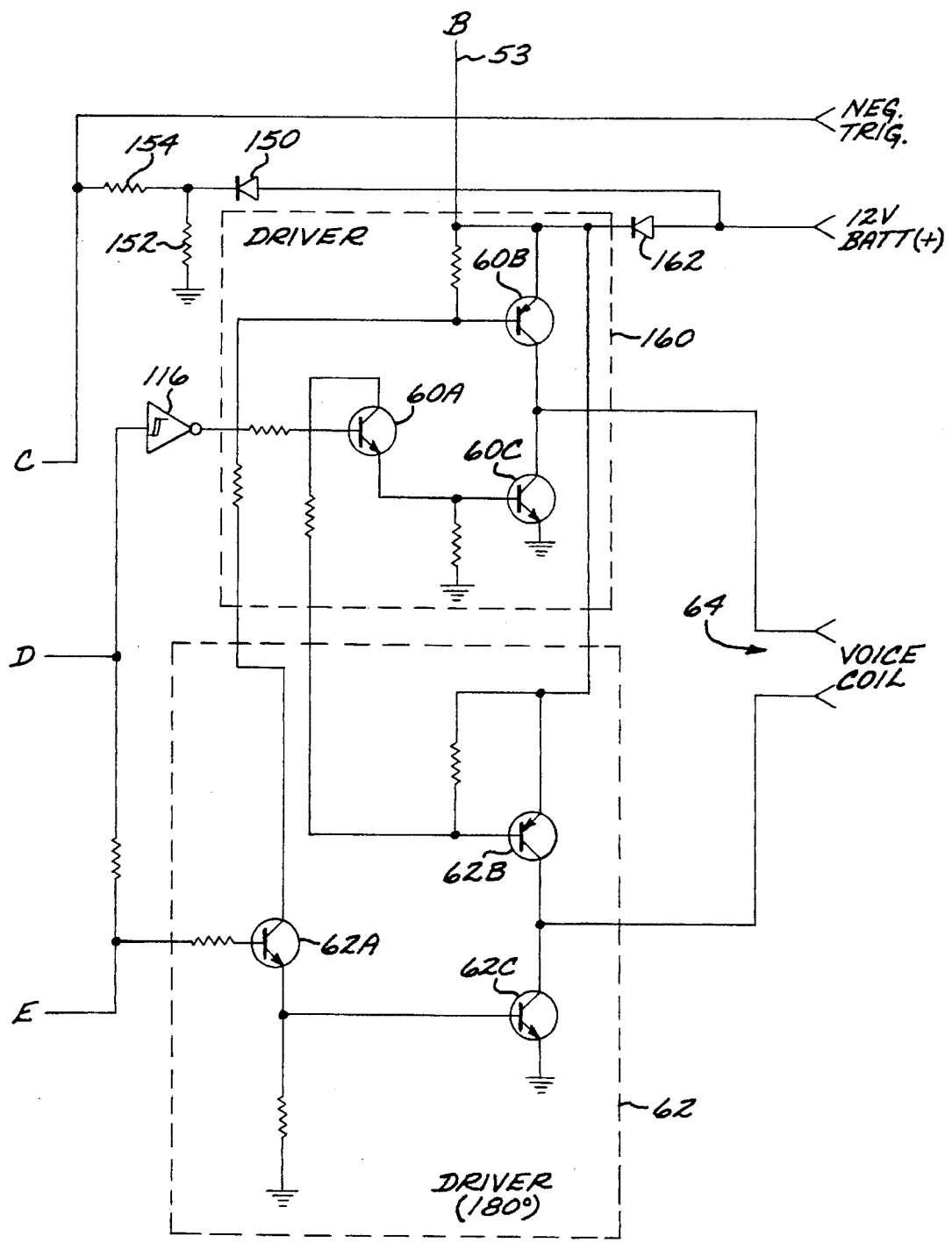

FIGS. 2A–2C are schematic diagrams of an exemplary circuit for implementing the siren system of FIG. 1. The power supply 52 includes the R-C filter consisting of resistor 52A and capacitor 52B, connected to power bus 53, in turn connected to the vehicle 12 V battery and to the backup battery 72. Node VF provides a filtered voltage which is used to power the various discrete logic components comprising the system 50.

The sweep oscillator 54 comprises a Schmidt trigger inverter 54A with hysteresis, wherein the threshold input voltage level depends on the device output state, and the resistor 54B and capacitor 54C. The output of the sweep oscillator 54 is fed to an integrator circuit comprising resistor 102 and capacitor 104, which integrates the oscillator output to provide a ramp voltage signal. The integrator output passes through a limiter circuit to the tone oscillator circuit 56. The limiter circuit, comprising resistor 106, capacitor 108 and Zener diode 110, limits the ramp voltage to about 4.7 V, the Zener value.

The tone oscillator 56 comprises another Schmidt trigger inverter 56A, resistor 56B and capacitor 56C. The oscillator 56 is voltage controlled by the voltage from the limiter output, and provides an square wave output which is ramped in frequency between about 1 Khz and 3 Khz in this embodiment. The sweep oscillator and tone oscillator operate continuously.

The state of the signal ENABLE determines whether the siren transducer 64 is activated. A logic high ENABLE state is the siren off condition; a logic low state is the siren activated condition. With ENABLE high, diodes 110 and 112 are forward biased to the conductive state, preventing the square wave oscillator signal from passing through respective Schmidt trigger inverter devices 114 and 116. A low ENABLE state back biases the diodes 110 and 112, and allows the square wave signal to pass through inverters 114 and 116.

The output drivers 60 and 62 form a well-known H-bridge driver configuration. Each driver includes a pair of drive transistors, respectively 60B, 60C, and 62B, 62C.

The output of the inverter 114 is passed to the driver 60 through inverter 116; the inverter 114 output is passed to driver 62 without passing through another inverter stage. Therefore, the signals at transistors 60A and 62A are 180 degrees out of phase. As a result, either transistors 60B and 62C will be conducting, with transistors 60C and 62B nonconducting, or transistors 60C and 62B will be conducting, with 60B and 62C nonconducting. This in turn causes the current supplied to the terminals of transducer 64 to alternate in polarity.

The timer 76 comprises a NAND circuit 76A, to which the ENABLE signal is coupled as the inputs. The gate output is connected to the cathode of diode 76B. An R-C network is connected to the anode of diode 76B, and determines the time constant of the timer circuit. In this exemplary embodiment, the component values of resistor 76C and capacitor 76D are selected to provide a 5 minute time constant, to automatically shut off operation of the transducer 64 after 5 minutes of constant operation. The timer output is connected to a set-reset flip-flop circuit 120, comprising gates 122, 124 and 126. Once the voltage on capacitor 76D rises to the threshold of gate 122, the gate output changes state from high to low, changing the state of the flip-flop circuit 120. The output of gate 124 is now high, and the output of gate 126 is now low. A low output at the flip-flop 120 output forward biases diode 128 to clamp the input of Schmidt trigger inverter 130 to ground, so that the output of inverter 130, the ENABLE signal, is high.

Capacitor 134, resistor 136 and diode 132 cooperate with circuit 120 to provide a power on-reset circuit to ensure that, on power up of system 50, ENABLE is high and the siren transducer is turned off.

The engine run detector 68 comprises a high gain AC amplifier comprising transistor 68A whose base is coupled to the voltage supply bus 53, in turn connected to the vehicle 12 V battery. Thus, any noise on the 12 V battery, e.g. alternator spikes, is amplified by transistor 68A. If insufficient noise is detected, it is assumed the engine is not running. Diode 134, capacitor 136 and resistor 138 form a peak detector, converting noise amplified by transistor 68A into a DC level, which when high enough causes transistor 140 to conduct enough current to turn on transistor 70A comprising the backup battery charging circuit 70. Instead of, or in addition to, the engine run detector, the charging circuit 70 may be controlled by an ignition sense circuit comprising diode 170 and resistor 172 connected to the vehicle ignition switch 174. When the switch is turned on, the resistor 174 is connected to the vehicle battery, biasing transistor 140 to conduct current to turn on transistor 70A. Other arrangements could also be used to control the battery charge circuit, so that the higher charging rate to the backup battery does not generally occur unless the vehicle battery is also being charged, e.g. by the vehicle alternator.

When transistor 70A is turned on by the engine run detector circuit 68 when the engine is running, or by the ignition sense circuit, charging current flows to the backup battery 72 through resistor 70B from the voltage bus 53. In this exemplary embodiment, resistor 70B has a nominal value of 120 ohms. In a nominal case when the vehicle battery is at 12 V and the backup battery is at 7.2 V, the charging current flowing through resistor 70B into the backup battery 72 is about 40 mA. Maintenance charging current also flows into the backup battery through resistor 70C no matter whether transistor 70A is turned on. This maintenance charging current is at a rate determined by the potential difference between the vehicle and backup batteries, divided by the value of resistor 70C. In this exemplary embodiment, resistor 70C is nominally 4.7 Kohms, so the maintenance charging current is on the order of 1–3 mA typically.

The system 50 further comprises a backup battery condition detector 74. Connected to the positive terminal of the battery 72, the detector 74 comprises a window comparator to determine whether the battery voltage is above a first voltage or below a second voltage. Either condition results in activation of an LED indicator and disabling the system 50 from responding to the security system to generate "chirps". The battery voltage is passed through resistor 74A to the inputs of the differential amplifier devices 74B and 74C. The threshold for comparator 74B is set by Zener diode 74G at about 9.6 V in this embodiment. The threshold for device 74C is set by the ratio of the value of resistor 74D to the sum of the resistance of resistors 74E and 74F, acting as a voltage divider circuit on the voltage on the bus 53. The ratio is selected to give a lower threshold for comparator 74C of about 2 V under normal bus conditions.

Normally in this embodiment, the backup battery 72 would have a voltage in the range of 5–8 V. If the battery had an open impedance, the voltage would rise to 12 V, i.e. the nominal voltage on bus 53. If multiple cells in the battery 72 were shorted or depleted, the voltage would drop below 2 V. Either case represents a battery failure, to be detected by circuit 74.

Comparator devices 74B and 74C have normally open collector outputs, at a high nominal state until the threshold on either device input is crossed. A high state at the device outputs results in transistor 74H and diode 74J biased to the nonconductive state. At that point, the output will go low, turning on transistor 74H and activating LED 74I, indicating battery failure. The LED 74I can located within the passenger compartment of the vehicle, for example, although other locations may be suitable. With an output of either device 74B or 74C at the low state, diode 74J will be biased to the conductive state. In this condition, capacitor 74K will act as an integrator on the negative trigger signal from the security system to activate the siren. This will have no significant effect on long negative trigger signals, indicating the siren is to sound continuously to signal an alarm tripped condition. However, the integrator will prevent the system 50 from responding to short negative trigger pulses used to generate chirps. Conventionally the chirps are to signal the arming or disarming of the security system. The short pulses are typically about 30 milliseconds in length, and the capacitor 74K value and resistor 74L value are selected so the capacitor does not have time to charge up before the short pulse ends. As a result, the input on Schmidt trigger inverter 130 does not rise enough for a short pulse to cause ENABLE to switch states to the low state, necessary to activate the speaker 64. The lack of arming/disarming chirps is a further indication to the vehicle owner that the backup battery has failed, and requires attention.

If the vehicle battery is disconnected, or the positive terminal grounded, no current will flow through diode 150 or resistor 152, resulting in turn in no current flow through resistor 154 to the input of Schmidt trigger inverter 156. Hence the output of inverter 156 will go high, driving the output ENABLE of inverter 130 low, turning on the siren speaker 64. Further, in the event the vehicle battery is disconnected, the battery 72 will supply current through diode 160 to the bus 53, to provide backup power for the system 50. Diodes 160 and 162 comprise a diode OR circuit. The positive terminal of the backup battery 72 is connected to the anode of diode 160. The positive terminal of the vehicle battery is connected to the anode of diode 162. The cathodes of diodes 160 and 162 are connected together to supply the load on bus 53. Therefore, whichever battery has the highest potential will supply the drive current to the load, i.e. the siren system.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A vehicle security system siren apparatus with a backup rechargeable battery, for installation in a vehicle having an electrical system with a vehicle battery, comprising:

a siren transducer for converting electrical signals into acoustic energy in response to security system trigger signals;

means for connecting said siren apparatus to said vehicle electrical system to provide electrical power to said apparatus;

a backup rechargeable battery for providing power to said apparatus and enable operation of said transducer in the event electrical power is not available from said vehicle security system; and means for charging said backup battery from said vehicle electrical system without unduly draining the vehicle battery, comprising means for charging said backup battery at a relatively high charging rate only while the vehicle is being operated, and means for charging said backup battery at a low charging rate when the vehicle is not being operated, thereby avoiding rapid discharge of the vehicle battery during intervals in which the vehicle is not being operated.

2. The siren apparatus of claim 1 wherein said vehicle further includes an engine, and said siren apparatus further comprises means for detecting whether said vehicle engine is running, and said charging means operates at said relatively high charging rate only while said engine is running.

3. The siren apparatus of claim 1 wherein said vehicle has an ignition switch, said apparatus further comprises means for detecting whether said ignition switch is "on", and said charging means operates at said relatively high charging rate while said ignition switch is "on."

4. The siren apparatus of claim 1 wherein said relatively low charging rate is less than 5 milliamperes so as to prevent rapid discharge of the vehicle battery during periods in which the vehicle is not in operation.

5. The siren apparatus of claim 1 further comprising means for activating said transducer in the event said vehicle battery is disconnected or said siren apparatus is disconnected from said security system, and means for setting a predetermined maximum siren duration in the event of said activation.

6. The siren apparatus of claim 5 wherein said means for setting a maximum siren duration comprises a timer activated by said transducer activation, said timer having a predetermined setting defining said maximum siren duration.

7. The siren apparatus of claim 1 further comprising means for detecting failure of said backup battery, and means activated by said failure detecting means for providing a warning to the security system user indicating failure of said backup battery.

8. The siren apparatus of claim 7 wherein said means for providing a warning comprises means for providing a visible signal.

9. The siren apparatus of claim 7 wherein said means for providing a warning comprises means for providing an audible indication signal indicating failure of said backup battery.

10. The siren apparatus of claim 9 wherein said means for providing an audible indication signal comprises means for generating a predetermined number of audible chirp signals, said chirp signals indicating failure of said backup battery.

11. The siren apparatus of claim 9 wherein said means for providing an audible indication signal comprises a voice synthesizer for generating a voice message indicating failure of said backup battery.

12. A vehicle security system siren apparatus with a backup rechargeable battery, for installation in a vehicle having an electrical system with a vehicle battery, comprising:

a siren transducer for converting electrical signals into acoustic energy in response to security system trigger signals;

means for connecting said siren apparatus to said vehicle electrical system to provide electrical power to said apparatus;

a backup rechargeable battery for providing power to said apparatus and enable operation of said transducer in the event electrical power is not available from said vehicle security system;

means for charging said backup battery from said vehicle electrical system, comprising means for charging said backup battery at a relatively high charging rate only while the vehicle is being operated, and means for charging said backup battery at a low charging rate when the vehicle is not being operated;

means for detecting failure of said backup battery; and means activated by said failure detecting means for providing a warning to the security system user indicating failure of said backup battery, said warning providing means comprising means for disabling said transducer from issuing audible chirp signals indicating arming or disarming of said security system.

13. A vehicle security system siren apparatus with a backup rechargeable battery, for installation in a vehicle having an electrical system including a vehicle battery, comprising:

a siren transducer for converting electrical signals into acoustic energy in response to security system trigger signals;

means for connecting said siren apparatus to said vehicle electrical system to provide electrical power to said apparatus;

a backup rechargeable battery for providing power to said apparatus and enable operation of said transducer in the event electrical power is not available from said vehicle security system;

means for charging said backup battery from said vehicle electrical system;

means for detecting failure of said backup battery; and warning means activated by said failure detecting means for providing a warning to the security system user indicating failure of said backup battery, said warning means comprising means for disabling said transducer from issuing audible chirp signals indicating arming or disarming of said security system.

14. A vehicle security system siren apparatus with a backup rechargeable battery, for installation in a vehicle having an electrical system with a vehicle battery, comprising:

a siren transducer for converting electrical signals into acoustic energy in response to security system trigger signals;

means for connecting said siren apparatus to said vehicle electrical system to provide electrical power to said apparatus;

a backup rechargeable battery for providing power to said apparatus and enable operation of said transducer in the event electrical power is not available from said vehicle security system;

means for charging said backup battery from said vehicle electrical system;

means for activating said transducer in the event said vehicle battery is disconnected or said siren apparatus is disconnected from said security system;

means for setting a maximum siren duration in the event of said activation;

means for detecting failure of said backup battery; and warning means activated by said failure detecting means for providing a warning to the security system user indicating failure of said backup battery, said warning means comprising means for disabling said transducer from issuing audible chirp signals indicating arming or disarming of said security system.

\* \* \* \* \*